Figure 1:
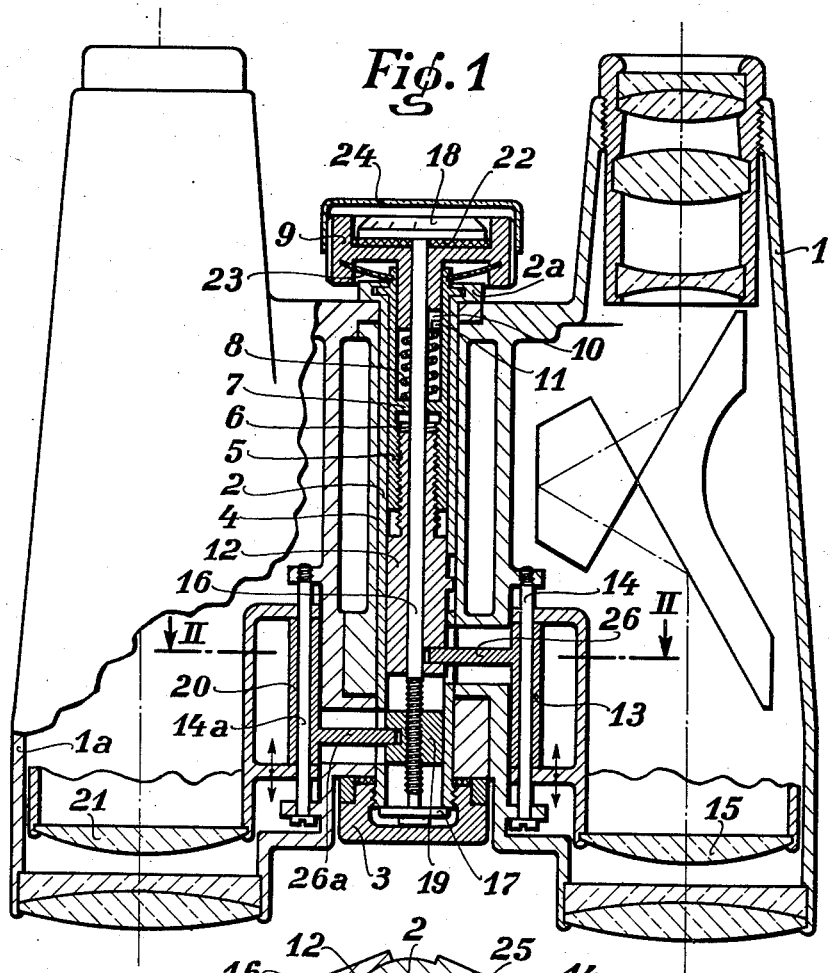

Nov. 5, 1957 — K. JENSEN — 2,811,895
UNIVERSAL DRIVE FOR THE FOCUSING OF BINOCULAR
OPTICAL APPARATUS, ESPECIALLY TELESCOPES
Filed Jan. 26, 1955

INVENTOR.
Kurt Jensen
BY Benj. T. Rauber
his attorney

United States Patent Office 2,811,895
Patented Nov. 5, 1957

2,811,895
UNIVERSAL DRIVE FOR THE FOCUSING OF BINOCULAR OPTICAL APPARATUS, ESPECIALLY TELESCOPES

Kurt Jensen, Wetzlar (Lahn), Germany, assignor to Ernst Leitz, G. m. b. H., Wetzlar (Lahn), Germany, a corporation of Germany Application January 26, 1955, Serial No. 484,181

Claims priority, application Germany May 17, 1954

4 Claims. (Cl. 88—34)

In binocular optical apparatus, especially telescopes as known today, the adjustment drive for the focusing, the so-called middle drive, is placed in the turn knuckle by which the distance of the two telescope tubes is proportioned or adjusted to the distance between the eyes of the observer.

Since frequently the eye defects of the observer are somewhat different for each eye, it has been known to make the eye-piece individually adjustable for each telescope tube and to provide it with a dividing scale according to dioptrics. This known arrangement involves adjustment at two separated places and is therefore inconvenient.

Moreover, an eye-piece that is positioned in a screw thread cannot be made tight against moisture and is therefore not applicable to those telescopes whose adjusting parts must lie within the housing of the telescope as, for example, telescopes with interior focusing. With such telescopes the eye-piece and the objective piece are mounted solidly and moisture-tight on the housing.

With known telescopes of this kind the focusing takes place through the positioning of reflecting systems as, for example, prisms, but it has also been proposed to make an inner lens of the objective adjustable.

My invention relates to binocular air-tight telescopes which are provided with a central drive and solves the problem of making possible individual adjustment in one of the tubes for proportioning or equalizing differences in the eyes of the observer. It provides besides the common adjustment, the adjustment also of individual parts. For example, the inner lens of the objective or ocular or of a prism system may take place in but one of the two tubes.

The problem is solved, according to my invention, by having the central drive for the common adjustment of the adjustable parts of both telescope tubes capable of being uncoupled from the individual movable part of one telescope tube so that then only a single or individual adjustment part is adjusted by the central drive.

More particularly a turning knob is positioned in the turn knuckle of the two telescope tubes with its axis working with one of the positioning parts, which axle is enclosed by a hollow axle and a hollow turning knob spring-coupled thereto and which acts on the other adjusting element. The two turning knobs are united through a friction coupling which can be released by pressing inwardly the outer turning knob against the spring action.

Figure 2:
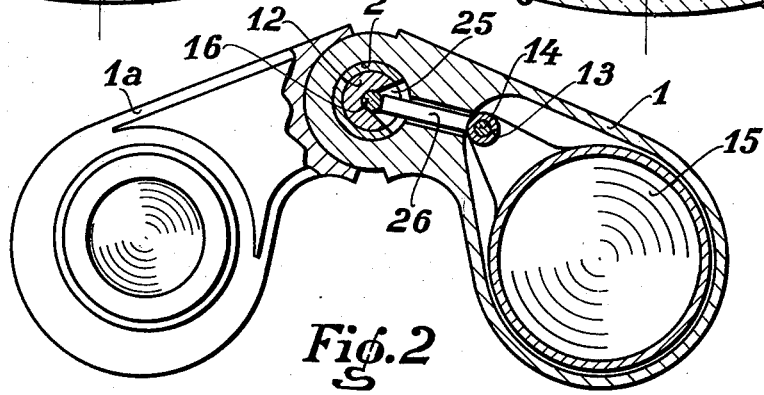

The various features of the invention are illustrated by way of example in the accompanying drawings which show a binocular telescope with interior focusing of the object lens and in which, Fig. 1 is a side view largely in longitudinal section, and Fig. 2 is a part cross-section on the line II—II of Fig. 1.

In the telescope illustrated in the drawings two telescope tubes 1 and 1ᵃ are in known manner rotatably mounted on a hollow axle 2 which has a flange 2ᵃ at one end and a tightening nut 3 at the opposite end by which it is positioned in the slightly conical ground-in joint 4 of the central coupling.

In the hollow axle 2 is set a tube 5 with internal screw threads 6. The tube 5 also has an inner flange 7 above the screw threads which serves as a supporting mounting for a spring 8. Also in the tube there is directly inserted a hollow turning knob 9 directly couplable to the tube 5 by means of a recess 10 and a pin 11 on the tube 5. This coupling permits the knob 9 to be pressed in against the action of the spring 8. Upon turning the knob 9 the tube 5 is rotated through the coupling 10, 11 and its inner thread 6 thereupon screws up and down respectively a non-rotatable tube 12 threaded into the inner threads of the tube 5.

A sleeve 13 which is slidable on a shaft 14 combined with the telescope tube 1 is joined on the tube 12 through a pin 26 extending into a sector-shaped recess 25 in the tube 12. The sleeve 13 carries with it the positioning element of the telescope, in the particular embodiment shown, an inner lens 15 of the objective.

In the tube 12, and the turning knob 9, is positioned a spindle 16 which is supported in the hollow axle 2 by means of a plate 17. The spindle 16 carries a disc 18 with divisions in dioptrics. The lower end of the spindle 16 is screw threaded and on these screw threads runs a non-rotatable guided nut 19 which is joined through the pin 26ᵃ combined with a sleeve 20 slidable on the guiding bar 14ᵃ which is combined to the second telescope tube 1ᵃ. The sleeve 20 carries with it an element to be adjusted, such as an inner object 21.

Between the disc 18 and the turning knob 9 is placed a sealing washer 22 which serves as a friction coupling when the turning knob is pressed by means of the spring 8 against the disc 18. Between the turning knob and the tube 5 a flexible sealing washer 23 is provided. The turning knob 9 is also provided with a transparent cap 24.

In the position indicated in the drawings rotation of the turning knob 9 acts on both adjusting elements 15 and 21. If, however, the turning knob 9 is pressed inwardly and the coupling between it and the spindle 16 is released, its rotation acts only for the positioning of the adjusting element 15.

Having described my invention, what I claim is:

1. A binocular which comprises a hollow axle, a pair of telescope tubes having hinge extensions mounted on said hollow axle to enable said tubes to swing toward and from each other, a rotatable threaded spindle extending axially through said axle and having a head at one end outside of said axle, an internally threaded cylinder rotatably mounted co-axially in said axle, a nut non-rotatably slidable in said axle and threaded on said spindle, an optical element in one of said tubes secured to and movable axially with said nut, a hollow bolt non-rotatably and slidably mounted in said hollow axle and threaded in said cylinder, an optical element in the other of said tubes secured to and movable with said bolt, a knob slidably mounted on said cylinder and a spring pressing said knob into engagement with said head to clutch said head to rotate with said knob and depressible to free said head from said knob.

2. The binocular of claim 1 in which said hinge extensions of said telescope tubes enclose said spindle, said internally threaded cylinder said nut and said hollow bolt.

3. The binocular of claim 1 in which said axle has a longitudinal slot and said hollow bolt has a pin extending into and slidable in said slot.

4. The binocular of claim 1 in which said knob has a pin and groove connection with said cylinder.

References Cited in the file of this patent

UNITED STATES PATENTS

| | | |
|---|---|---|
| 1,338,241 | Meling | Apr. 27, 1920 |
| 2,581,865 | Kershaw et al. | Jan. 8, 1952 |
| 2,602,371 | Harford | July 8, 1952 |

FOREIGN PATENTS

| | | |
|---|---|---|
| 4,701 | Great Britain | of 1904 |
| 973,186 | France | Sept. 13, 1950 |
| 543,332 | Germany | Feb. 4, 1932 |
| 129,309 | Sweden | Aug. 29, 1950 |